March 1, 1966  W. E. PERKINS  3,237,757
CONVEYOR BELT
Filed Sept. 3, 1963

INVENTOR.
WILDER E. PERKINS
BY *James and Franklin*
ATTORNEYS

United States Patent Office 3,237,757
Patented Mar. 1, 1966

3,237,757
CONVEYOR BELT
Wilder E. Perkins, Nutley, N.J., assignor to Raybestos-Manhattan, Inc., Passaic, N.J., a corporation of New Jersey
Filed Sept. 3, 1963, Ser. No. 306,059
6 Claims. (Cl. 198—198)

This invention relates to conveyor belts, and more particularly to flat belts with transverse ribs.

The general object of the invention is to improve such flat conveyor belts having transverse ribs. A more particular object is to employ a relatively soft rubber-like or elastomeric material which bends under load, but in which the ribs are so proportioned and so spaced that when bent over, a rib is supported by an adjacent rib before being bent excessively or flattened.

Still another object is to so shape the ribs that they present a sharp corner to the load whether the load be light or heavy, that is, whether the rib be upright or bent.

Another object is to devise a belt suitable for conveying parcels, as in a post office or a parcel delivery service. However, by appropriate changes the belt may be designed for use with heavier objects such as trunks and luggage.

To accomplish the foregoing general objects, and other more specific objects which will hereinafter appear, my invention resides in the conveyor belt elements and their relation one to another as are hereinafter more particularly described in the following specification. The specification is accompanied by a drawing in which.

Figure 1:
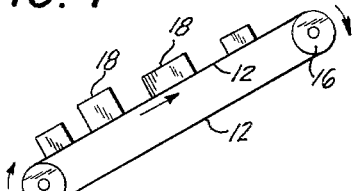
FIG. 1 represents an upwardly inclined conveyor used for handling parcels.

Referring to the drawing, and more particularly to FIG. 1, a conveyor belt 12 is carried on rollers 14 and 16, one of which is power driven. The conveyor here shown is inclined and serves to carry parcels 18 upward. However, it could be horizontal or descending. The belt is a flat belt.

Figure 2:
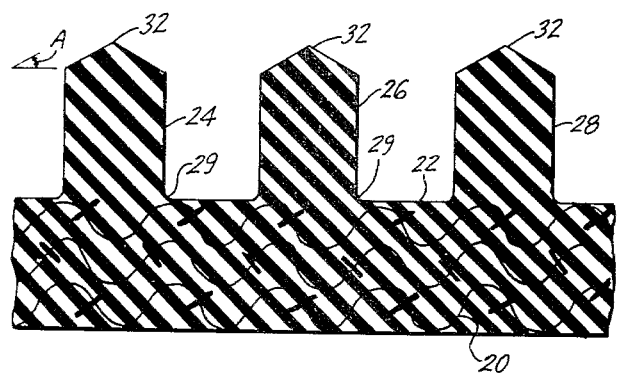
FIG. 2 is a fragmentary section drawn to enlarged scale and taken longitudinally of the belt.
Figure 4:
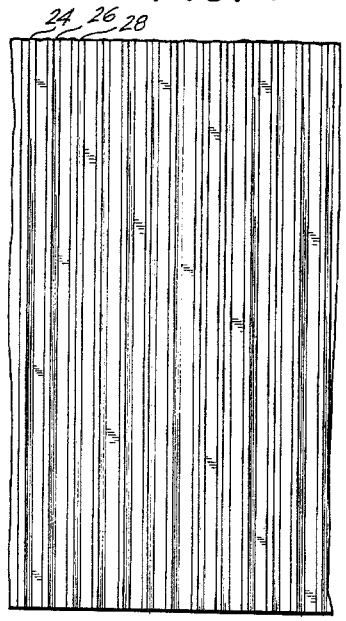
FIG. 4 is a plan view of a small section of the belt and showing the ribs extending transversely of the belt.
Figure 3:
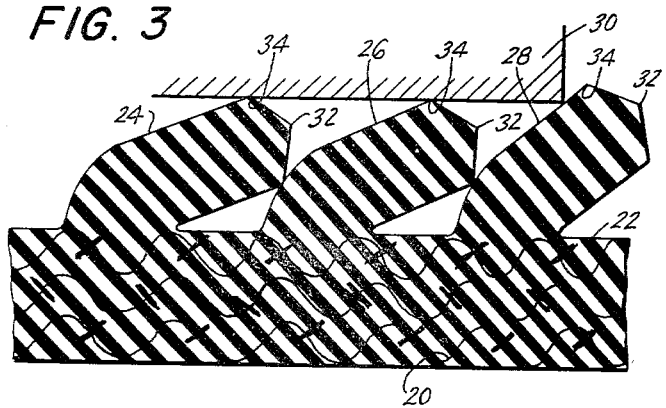
FIG. 3 is a similar view showing the relation of the parts under load.

Referring now to FIGS. 2 and 3, the conveyor belt comprises a carcass made of fabric material 20, combined with a surface of an elastomeric material 22 molded to provide parallel ribs 24, 26, and 28 which extend transversely of the belt, as shown also in FIG. 4. The molded material is so formulated as to bend under the anticipated load, and the spacing between the ribs and the height of the ribs are so proportioned that when bent over, a rib reaches and is supported by an adjacent rib before being flattened. This is shown in FIG. 3 in which the ribs are bent under the weight of a parcel 30, and in which rib 24 is supported by rib 26, which in turn is supported by rib 28. Thus the ribs bend only part way over.

In accordance with a further feature of the invention, the ribs are generally rectangular in cross-section except at the top, where the cross-section is an inverted blunt V 32. By comparing FIGS. 2 and 3 it will be seen that whether upright as in FIG. 2, or bent as in FIG. 3, the rib presents a corner to the bottom of a load resting thereon. With a very light load the corner is that shown at 32 in FIG. 2, and with a heavier load the corner is that shown at 34 in FIG. 3.

The bending, distorting and compressing of the ribs under load improve the abrasion resistance and wear of the ribs. If the ribs were stiff and did not give they would wear, due to slippage of the load, much more rapidly than with this design.

In one particular case the ribs have a width of 3/32 of an inch and a height of 5/32 of an inch, and the open spaces between the ribs have a width of 3/32 of an inch. A fillet 29 is preferably provided at the base of the rib, and in the present case this has a radius of 0.015 inch. The blunt top angle at 32 is 120°, or differently expressed, the base angle A of the top triangle in FIG. 2 is 30°. The particular dimensions here exemplified is intended for use with parcels of moderate weight, such as those handled in a post office or in a parcel delivery service. For that purpose the carcass could be made of three or more plies of light fabric, similar to "numbered" duck, or even sheetings or other light materials. It also could be made of two or more plies of heavy belt duck, such as 28, 32 or 42 oz. These fabrics could be cotton or synthetic (rayon, nylon, dacron) as might be suitable.

A solid woven fabric may be employed for the carcass, with a special rubber or synthetic rubber cover vulcanized thereto. The carcass could also be made of single strand cord construction or cord fabric of either natural or synthetic fibre if desired. In fact, carcass of this belt could be made of any conventional material or construction.

For use with luggage and trunks the ribs may have a heavier section, or a somewhat harder but still yieldable compound may be used, or both. Moreover other elastomeric materials may be used, such as silicone, vinyl, polyethylene, ethylene propylene terpolymer, Hypalon (Du Pont's product, which is chemically chloro-sulphinated polyethylene) or polyacrylate and other plastics.

The plies may be frictioned with rubber and/or skimmed with rubber, all in accordance with conventional belt manufacturing techniques. The rubber used may be natural rubber, or synthetic rubber, or mixtures of the two. Moreover, other elastomeric materials may be used, such as silicone or polyacrylate plastics. Any rubber-like polymer may be used if it can be formulated to distort as required above to prevent slippage.

The compound used is so formulated that it is flexible and bends under the anticipated load. When designed for a heavier load a stiffer formulation may be employed, but the rubber should not be so hard that it does not bend under the load, it being evident that the top corner 32 would be quickly worn away if the ribs were not to bend. Moreover, a soft material exerts a better frictional grip on the load, because of its softness, and also because of the resulting bend shown in FIG. 3 of the drawing.

The height of the rib is limited relative to its width, it being important to avoid so great a height that the rib tends to assume an "S" bend instead of the simple bend shown in FIG. 3.

In general, the materials previously used for such belts may be used here, and the improvement resides primarily in the configuration and proportioning of the ribs, rather than in the material employed.

Figure 5:
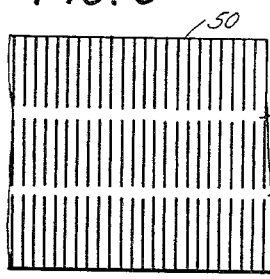
FIG. 5 is a plan view showing a belt in which the ribs are aligned but interrupted at intervals across the belt.

It is not necessary that the ribs extend continuously across the entire width of the belt. If desired, the ribs may be interrupted, and such an arrangement is shown in FIG. 5 in which the belt 50 has ribs which are interrupted as shown at 52 and 54. This increases the flexibility of the ribs for a given formulation and load, because of the shortened length of the individual ribs. Apart from that, the interruptions shown at 52 and 54 may be desired for greater ease in molding the belt, and in cleaning.

Figure 6:
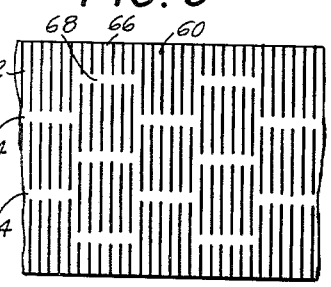
FIG. 6 is a similar view showing a modified pattern of ribs.

The interruptions need not be continuous for the entire length of the belt, and in FIG. 6 I show a belt 60 which has transverse ribs 62 interrupted at 64. This is followed by a section in which transverse ribs 66 are interrupted at 68. The interruptions or channels 68 are offset from the channels 64, as is clearly shown in the drawing. The pattern then may repeat. Other more intricate patterns of ribs may be provided.

Figure 7:
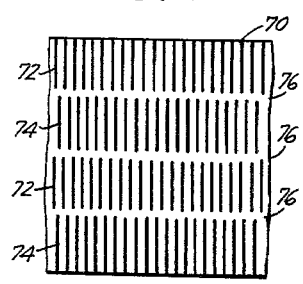
FIG. 7 shows another belt in which the interrupted rib sections are somewhat offset.

In FIG. 7, the belt 70 has transverse ribs 72 which are slightly offset from the adjacent transverse ribs 74. The ribs 72 and 74 are separated by interruptions or longitudinal channels 76. The ribs 72 are aligned with spaces between ribs 74, and vice versa.

If desired some ribs may be interrupted and others not. Every other rib instead of every rib could be interrupted, or one out of three, or two out of three, and so on.

The ribs are shown with parallel sides, that is, basically rectangular except at the top, but it will be understood that the ribs could be tapered somewhat if desired, that is, they could be made slightly wider at the base. The back of the belt may be bareback, friction surface or rubber covered for a more frictional surface and/or better wearing surface, as conditions may warrant. The ribs when constructed as described herein effectively prevent slippage on inclined conveyors.

It is believed that the construction and the theory underlying the same, as well as the advantages of my improved conveyor belt, will be apparent from the foregoing detailed description. The belt is provided with ribs which help grip and move a parcel or other article placed thereon. Each rib presents a corner to the bottom of the parcel, whether upright under a very light load, or bent under a heavier load. The belt is characterized by increased abrasion resistance and wear because of the different surfaces employed at different times, and because there are three corners at the top of each rib which are utilized, instead of only one, and also because the ribs give or yield under impact of loading. The belt is self-cleaning, because the ribs separate or open up as the belt runs around the rollers carrying the same, permitting dirt to fall out. The ribs are flexible and bend, but are protected against excessive bending and consequent wear or breakage at the foot of each rib. They are prevented from bending flat, which would make the corners ineffective.

The belt is well adapted to handle not only parcels and luggage, but also to handle bagged material in cloth or paper bags, or other packaged material. It can handle parts made of metal or the like, even if water soaked or oil soaked. The belt may serve as a hot doughnut take-off belt. In such cases the grooves between the ribs form drainage passages, and permit rapid drainage, drying and/or cooling, because of free air circulation between the ribs.

It will be understood that while I have shown and described the invention in a preferred form, changes may be made without departing from the scope of the invention as defined in the following claims.

I claim:

1. A conveyor belt having a surface of an elastomeric material molded to provide parallel ribs extending transversely of the belt, the molded material being formulated to bend under the anticipated load, said ribs being generally rectangular in cross-section except at the top where the cross-section is an inverted blunt V, so that whether upright or bent a rib presents a corner to the bottom of a load resting thereon.

2. A conveyor belt having a surface of an elastomeric material molded to provide parallel ribs extending transversely of the belt, the molded material being formulated to bend under the anticipated load, the spacing between the ribs and the height of the ribs being so proportioned that when bent over, a rib reaches and is supported by an adjacent rib before being flattened, said ribs being generally rectangular in cross-section except at the top where the cross-secion is an inverted V, so that whether upright or bent a rib presents a corner to the bottom of a load resting thereon.

3. A conveyor belt comprising a carcass made of multiple plies of fabric, combined with a surface of a rubber material molded to provide parallel ribs extending transversely of the belt, the molded rubber being formulated to bend under the anticipated load, said ribs being generally rectangular in cross-section except at the top where the cross-section is an inverted blunt V, so that whether upright or bent a rib presents a corner to the bottom of a load resting thereon.

4. A conveyor belt comprising a carcass made of multiple plies of fabric, combined with a surface of a rubber material molded to provide parallel ribs extending transversely of the belt, the molded rubber being formulated to bend under the anticipated load, the spacing between the ribs and the height of the ribs being so proportioned that when bent over, a rib reaches and is supported by an adjacent rib before being flattened, said ribs being generally rectangular in cross-section except at the top where the cross-section is an inverted blunt V, so that whether upright or bent a rib presents a corner to the bottom of a load resting thereon.

5. A conveyor belt as defined in claim 1 in which the blunt V angle at the top of the ribs is about 120°.

6. A conveyor belt as defined in claim 2 in which the ribs have a width of about 3/32 of an inch and a height of about 5/32 of an inch, and in which the blunt V angle at the top of the ribs is about 120°, and in which the open spaces between the ribs have a width of about 3/32 of an inch.

References Cited by the Examiner

UNITED STATES PATENTS

| | | | |
|---|---|---|---|
| 2,539,617 | 1/1951 | Gestwick | 152—209 |
| 2,784,835 | 3/1957 | Dixon | 198—198 |
| 2,815,850 | 12/1957 | Davis | 198—199 |
| 2,925,165 | 2/1960 | Rake | 198—198 |

SAMUEL F. COLEMAN, *Primary Examiner.*

R. J. HICKEY, *Assistant Examiner.*